US009532281B2

(12) United States Patent
Bontu et al.

(10) Patent No.: US 9,532,281 B2
(45) Date of Patent: Dec. 27, 2016

(54) METHODS AND SYSTEMS FOR WIRELESS COMMUNICATION IN HETEROGENEOUS NETWORKS

(71) Applicant: BlackBerry Limited, Waterloo (CA)

(72) Inventors: Chandra Sekhar Bontu, Nepean (CA); Zhijun Cai, Ashburn, VA (US); Yi Song, Plano, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 0 days.

(21) Appl. No.: 14/816,865

(22) Filed: Aug. 3, 2015

(65) Prior Publication Data
US 2015/0341835 A1 Nov. 26, 2015

Related U.S. Application Data

(62) Division of application No. 13/856,224, filed on Apr. 3, 2013, now Pat. No. 9,100,883.

(51) Int. Cl.
*H04W 4/00* (2009.01)
*H04W 36/00* (2009.01)
(Continued)

(52) U.S. Cl.
CPC ......... *H04W 36/0083* (2013.01); *H04W 16/32* (2013.01); *H04W 36/0061* (2013.01);
(Continued)

(58) Field of Classification Search
CPC ...... H04W 36/32; H04W 36/22; H04W 36/30; H04W 36/00; H04W 76/04; H04W 16/32; H04W 36/0083
(Continued)

(56) References Cited

U.S. PATENT DOCUMENTS

2011/0183672 A1 7/2011 Jeong et al.
2013/0229953 A1 9/2013 Nam et al.
(Continued)

FOREIGN PATENT DOCUMENTS

WO 2011/100492 8/2011
WO 2013/040070 3/2013

OTHER PUBLICATIONS

3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).
(Continued)

*Primary Examiner* — Sai-Ming Chan
(74) *Attorney, Agent, or Firm* — Fish & Richardson P.C.

(57) ABSTRACT

Systems, methods, and apparatuses for data and/or control offloading and handover in heterogeneous wireless communication networks are provided. Data and/or control packets can be offloaded to a coordinating base station while a user equipment (UE) remains associated with its serving cell. The packets are still transferred between the serving base station and the core network, and the offloaded data and/or control packets are forwarded from the serving base station to the coordinating base station for transmission to the UE. Furthermore, during a handover process, the serving base station and coordinating base station may independently schedule and send a handover command to the UE to reduce the radio link failure rate.

20 Claims, 7 Drawing Sheets

(51) Int. Cl.
| | |
|---|---|
| *H04W 36/30* | (2009.01) |
| *H04W 36/32* | (2009.01) |
| *H04W 76/04* | (2009.01) |
| *H04W 16/32* | (2009.01) |
| *H04W 36/22* | (2009.01) |
| *H04W 88/08* | (2009.01) |

(52) U.S. Cl.
CPC ........... *H04W 36/22* (2013.01); *H04W 36/30* (2013.01); *H04W 36/32* (2013.01); *H04W 76/046* (2013.01); *H04W 88/08* (2013.01)

(58) Field of Classification Search
USPC ........................................................ 370/331
See application file for complete search history.

(56) References Cited

U.S. PATENT DOCUMENTS

2014/0211757 A1* 7/2014 Pereira .............. H04W 36/0055
370/331

2015/0031369 A1* 1/2015 Gunnarsson .......... H04W 36/04
455/438

OTHER PUBLICATIONS

Ericsson et al; "Small Cell Challenges and Benefits of Dual Connectivity," 3GPP R2-130416, Malta, Jan. 28-Feb. 1, 2013 (8 pgs.).

3GPP TS 36.423 V8.0.0 (Dec. 2007) Technical Specification Group Radio Access Network; Evolved Universal Terrestrial Radio Access Network (EUTRAN); X2 application protocal (X2AP) (Release 8) (60 pages).

3GPP TS 36.331 V11.0.0 (Jun. 2012) Technical Specification Group Radio Access Network; Evolved Universal Terrestrial Radio Access (E-UTRA); Radio Resource Control (RRC); Protocol Specification (Release 11) (302 pages).

International Search Report for PCT Application No. PCT/US2013/035134, dated Nov. 27, 2013 (9 pgs.).

International Search Report for Application No. PCT/US2013/035134, dated Apr. 3, 2014, 17 pages.

* cited by examiner

METHODS AND SYSTEMS FOR WIRELESS COMMUNICATION IN HETEROGENEOUS NETWORKS

CROSS-REFERENCE TO RELATED APPLICATION

This application is a divisional of U.S. patent application Ser. No. 13/856,224, filed on Apr. 3, 2013 the entire contents of which is hereby incorporated by reference herein.

TECHNICAL FIELD

The present disclosure generally relates to heterogeneous wireless communication networks, and more particularly, to systems and methods for data and/or control offloading and handover in heterogeneous wireless communication networks.

BACKGROUND

In an Evolved Universal Terrestrial Radio Access Network (E-UTRAN), cells of different coverage sizes are deployed to improve cell coverage or to offload traffic. In an E-UTRAN network, small cells (e.g., pico cells, relay cells, or femto cells) are deployed with overlaid large cells (e.g., macro cells). A network including large cells and small cells is referred to as a heterogeneous wireless communication network or, for simplicity, as a heterogeneous network.

Macro cells and small cells may operate in different frequencies. For example, in a heterogeneous network consisting of macro cells and pico cells, the macro cells may operate on one frequency while the pico cells may operate on another frequency. Operating the macro cells and pico cells on different frequencies helps to reduce the interference among cells.

SUMMARY

Consistent with disclosed embodiments, there is provided a method for wireless communication. The method comprises maintaining a radio link connection with a first base station, receiving offloading information from the first base station, and connecting with a second base station based on the offloading information, wherein the radio link connection with the first base station is maintained for a period of time following connection to the second base station. The offloading information may be received in a radio resource control (RRC) reconfiguration message, and the offloading information may include information associated with the second base station. The offloading information may include a two-bit offloading flag. The method may further comprise transmitting a measurement report to the first base station prior to receiving the offloading information. The method may also comprise receiving or transmitting data packets from the second base station. Additionally, the method may comprise receiving or transmitting control signaling from the second base station. The first base station may be a macro cell and the second base station may be a low power cell. The radio link connection with the first base station may be maintained by using a first cell radio network temporary identity (C-RNTI) and a radio link connection with the second base station is maintained by using a second C-RNTI. A user equipment (UE) may receive data packets from the second base station and the data packets may be forwarded from the first base station to the second base station. The offloading information includes at least one of control offloading information and data offloading information.

Consistent with disclosed embodiments, there is also provided a user equipment (UE) configured to maintain a radio link connection with a first base station, receive offloading information from the first base station, and connect with a second base station based on the offloading information, wherein the radio link connection with the first base station is maintained for a period of time following connection to the second base station.

Consistent with disclosed embodiments, there is also provided a method for wireless communication. The method comprises transmitting offloading information to a user equipment (UE), and forwarding packets received from a network node for the UE to an offloading base station, wherein a radio link connection with the UE is maintained for a period of time following forwarding the packets to the offloading base station.

Consistent with disclosed embodiments, there is also provided a base station configured to transmit offloading information to a user equipment (UE), and forward packets received from a network node for the UE to an offloading base station, wherein a radio link connection with the UE is maintained for a period of time following forwarding the packets to the offloading base station.

Consistent with disclosed embodiments, there is also provided a method for wireless communication. The method comprises receiving a handover request message from a base station, and forwarding packets received from the base station to a user equipment (UE), wherein a radio link connection between the UE and the base station is maintained for a period of time following forwarding the packets to the UE.

Consistent with disclosed embodiments, there is also provided a base station configured to receive a handover request message from another base station, and forward packets received from the other base station to a user equipment (UE), wherein a radio link connection between the UE and the other base station is maintained for a period of time following forwarding the packets to the UE.

Consistent with disclosed embodiments, there is also provided a method for wireless communication. The method comprises sending a measurement report to a first base station, receiving a radio resource control (RRC) connection reconfiguration message from at least one other base station, and connecting to a second base station based on the RRC connection reconfiguration message. Consistent with disclosed embodiments, the method may further comprising disconnecting with the first base station. The RRC connection reconfiguration message may be received on radio resources scheduled by the at least one other base station. The measurement report may be determined based on uplink signal quality. The second base station may be one of the at least one other base station. The method may further comprising receiving the RRC connection reconfiguration message from the first base station. The first base station may be a macro cell and the second base station may be a low power cell. The measurement report may include measurements associated with neighboring base stations that are selected by a user equipment (UE). The RRC connection reconfiguration message may be forwarded from the first base station to the second base station. The RRC connection reconfiguration message may be included in a handover forward request message. The RRC connection reconfiguration message may include mobility information associated with a user equipment (UE). The first base station may be selected by a user equipment (UE) for sending the measurement report. The at least one base station may be identified when received signal quality with respect to the at least one base station at a user equipment (UE) is above a predetermined threshold. The predetermined threshold may be transmitted to the UE by the first base station.

Consistent with disclosed embodiments, there is also provided a user equipment (UE) configured to send a measurement report to a first base station, receive a radio resource control (RRC) connection reconfiguration message from at least one other base station, and connect to a second base station based on the RRC connection reconfiguration message.

Consistent with disclosed embodiments, there is also provided a method for wireless communication. The method comprises receiving a measurement report, determining a target base station for handover, transmitting a handover forward request message to at least one base station, the handover forward request message including a radio resource control (RRC) connection reconfiguration message, and transmitting the RRC connection reconfiguration message to a user equipment (UE).

Consistent with disclosed embodiments, there is also provided a base station configured to receive a measurement report, determine a target base station for handover, transmit a handover forward request message to at least one base station, the handover forward request message including a radio resource control (RRC) connection reconfiguration message, and transmit the RRC connection reconfiguration message to a user equipment (UE).

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, and together with the description, illustrate and serve to explain various embodiments.

DETAILED DESCRIPTION

The present disclosure relates to systems, methods, and apparatuses for data and/or control offloading and handover in heterogeneous wireless communication networks. In a typical heterogeneous cellular deployment, low-power cells, such as, pico cells, femto cells, relay nodes, are deployed as an overlay to existing macro cells. This overlay deployment is intended to help meet the demand for ever-increasing mobile data applications and/or coverage. As a user equipment (UE) moves across cell boundaries, a mobility procedure such as cell handover or cell reselection is usually performed. The related overlay deployment increases the number of handovers and the related burden of load balancing across the network. Furthermore, when the overlay network is reusing the same carrier frequency as the existing cellular network, there is an increasing possibility of radio link failures (RLFs) due to the interference between the overlay network and the existing cellular network.

To reduce unnecessary handovers in heterogeneous wireless communication networks, in some implementations, a serving base station (BS) of a UE may offload part or all of the data and/or control plane traffic for the UE temporarily via near-by low-power or macro cell(s). Unlike in a Release 11 (Rel-11) long term evolution (LTE) network where the UE maintains a single radio resource control (RRC) connection with the network, in implementations consistent with this disclosure, the UE is in a RRC connected state with both a serving cell and an offloading cell at the same time and can receive a message from both cells during the data offloading. In some implementations consistent with this disclosure, data and/or control packets are offloaded to another coordinating base station or cell. And in some implementations this packet offload occurs without switching the data and/or control path from the evolved packet core (EPC) to the coordinating cell. Furthermore, in some implementations, if the serving base station decides to switch the data path to the coordinating base station, for example, when it is determined that the UE is going out of the serving cell's coverage, an RRC connection reconfiguration message to the UE can be transmitted by the serving cell as well as the coordinating cells. The additional transmissions of the RRC connection reconfiguration message from the coordinating cells will, in some implementations, reduce the RLFs.

Reference will now be made in detail to the example embodiments implemented according to the disclosure; the examples are illustrated in the accompanying drawings. Wherever possible, the same reference numbers will be used throughout the drawings to refer to the same or like parts.

Figure 1:
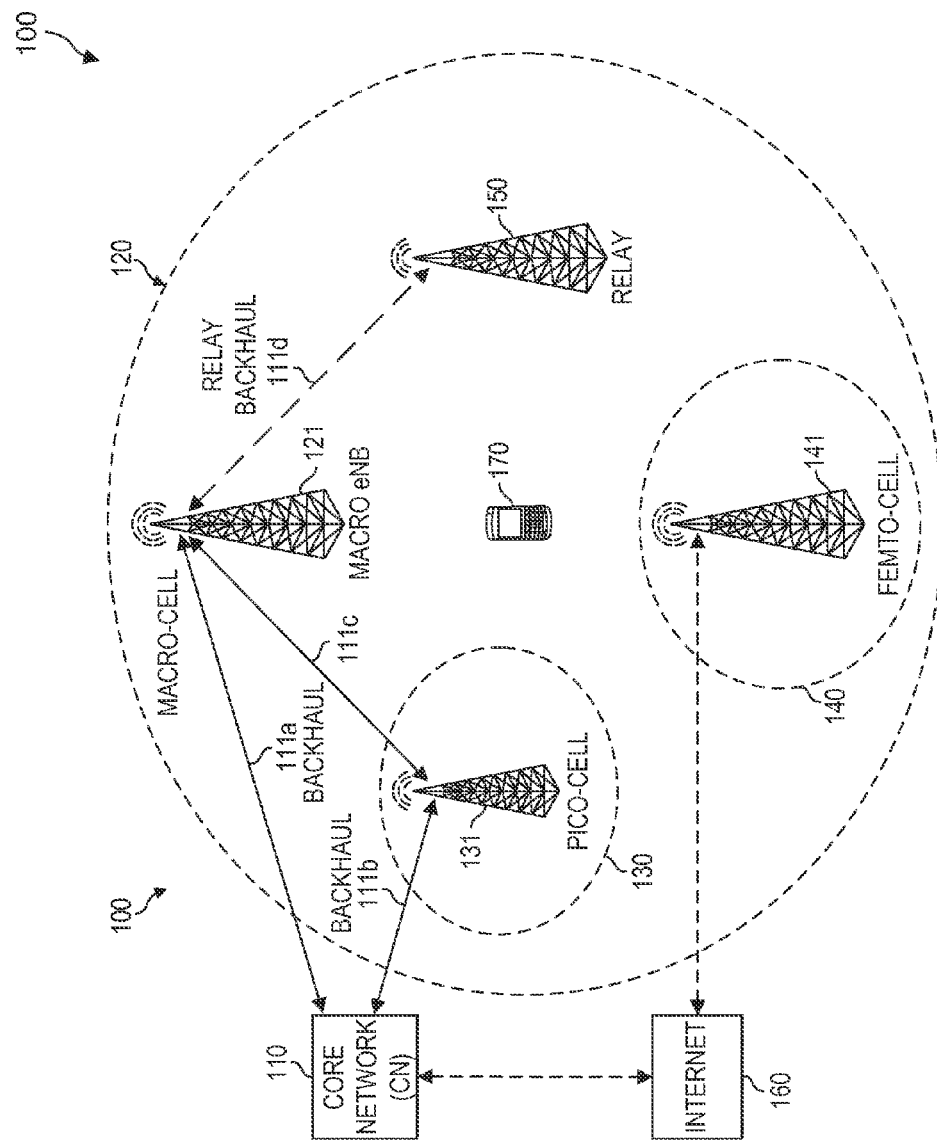
FIG. 1 illustrates an example heterogeneous wireless communication network for implementing methods and systems consistent with the present disclosure.

FIG. 1 illustrates an example heterogeneous wireless communication network 100 in which systems and methods consistent with this disclosure may be implemented. The term "heterogeneous wireless communication network" or "heterogeneous network" may also be referred to as a "HetNet." The illustrated HetNet 100 includes a core network 110 and a macro cell or overlay cell 120. The term "cell" or "wireless cell" generally refers to an area of coverage of wireless transmission by a network or network component, such as an access node. The core network 110 is, in some implementations, connected to a data network such as Internet 160.

In the illustrated implementation, macro cell 120 includes at least one base station. The term "base station" (BS) can be interchangeably used with a cell, a network node, an access node, or a network component. Two or more base stations may operate on the same radio frequency or on different radio frequencies. The base station is, in some implementations, an overlay access node 121, which is connected to the core network 110 via a backhaul link 111a, including optical fiber or cable. The backhaul link between the macro eNB and the core network is referred to as an S1 interface.

The term "overlay access node" generally refers to a network element or component that at least partly serves to form a wireless cell. In one implementation in which the network 100 is a long term evolution (LTE) network, the overlay access node 121 can be a Universal Terrestrial Radio Access Network (UTRAN) node B or "eNB" which is part of an evolved Universal Terrestrial Radio Access Network (E-UTRAN). An eNB that forms an overlay access node of a macro cell can be generally referred to as a "macro eNB." The term "eNB" may be interchangeably used with an "evolved node B." The eNBs may cooperate to conduct a mobility procedure for User Equipment (UE) in the network 100.

The network 100 also includes, in some implementations, one or more underlay cells, for example, a pico cell 130 and a femto cell 140. In some implementations, the underlay cells have a coverage at least partially overlapping with the coverage of the macro cell 120. While the term "underlay cell" is described herein in the context of LTE, the implementations described herein can be adapted for other wireless standards that have components similar to underlay cells, such as cellular telecommunication systems such as Global System for Mobile Communication (GSM) protocols, Universal Mobile Telecommunications System (UMTS), IEEE 802.11 WLAN, and IEEE 802.16 WiMAX, which may also include small cells such as pico/femto cells.

Although FIG. 1 illustrates one pico cell and one femto cell, the network 100 can include more or less of such cell type. The underlay cells 130, 140 have a smaller coverage than the overlay cell 120. For example, in a suburban environment, the overlay cell 120 may have a coverage radius of 0.5 kilometer, while the underlay cells 130, 140 may have a coverage radius of 0.2 kilometer.

Access nodes 131, 141 forming the underlay cells 130, 140 use a lower transmission power than that of the overlay access node 121. The underlay cells 130, 140 may further include a range expansion area used for increasing the coverage area for the cells having a smaller coverage.

The pico cell 130, for example, includes a pico eNB 131 connected to the core network (CN) 110 via a backhaul link 111b and to the macro eNB 121 via a backhaul link 111c. The backhaul link between the macro eNB and the pico eNB is referred to as an X2 interface. The backhaul links 111b and 111c include, for example, cable, fiber, and wireless links. In some implementations, the pico eNB 131 can have a transmission power that is, for example, about 30 dBm, which is about 13 to 16 dB lower than the transmission power of the macro eNB 121, which is about 43 to 46 dBm.

The femto cell 140, for example, includes a femto eNB 141 connected to the core network 110 via the Internet 160 via a wired or wireless connection. The femto cell 140 is a subscription based cell and can be referred to as a closed subscription group (CSG) cell. The term "closed subscription group (CSG)" can be interchangeably used with closed subscriber group. The term "femto eNB" can also be referred to as a "home eNB (HeNB)." In such instances, the macro eNB 121 can be referred to as a source eNB. In some implementations, the femto eNB 141 can have a transmission power that is, for example, about 20 dBm, which is about 23 to 26 dB lower than that of the macro eNB 121.

The network 100 also includes, in some implementations, a relay node 150 that, for example, serves to wirelessly relay data and/or control information between the macro eNB 121 and user equipment 170. The macro eNB 121 and the relay node 150 are connected to each other via a wireless backhaul link 111d. In such an instance, the macro eNB 121 is referred to as a donor eNB. In some implementations, the relay node 150 has a transmission power that is, for example, about 30 or 37 dBm, which is about 13 dB or 6 dB lower than that of the macro eNB 121. The term "underlay access node" may sometimes be used in this disclosure to refer to pico eNBs, femto eNBs, or relay nodes.

The CN 110 can be a backbone network, which may be a central part of the telecommunications system. In certain implementations, evolved packet core (EPC) serves as a main component of the CN 110. The CN 110 can include a mobility management entity (MME), a serving gateway (SGW), and a packet data network gateway (PGW). The MME is a main control element in the CN 110 and it is responsible for the functionalities comprising the control plane functions related to subscriber and session management. The SGW serves as a local mobility anchor such that the packets are routed through this point for intra EUTRAN mobility and mobility with other legacy 2G/3G systems. The SGW functions may include the user plane tunnel management and switching. The PGW provides connectivity to a services domain comprising external networks, such as IP networks.

The UE 170 communicates wirelessly with the overlay access node 121 or the underlay access nodes 131, 141, 150, depending on the location or the existence of subscription in the case of the femto cell 140. The term "user equipment," alternatively "UE," refers to various devices with telecommunications capabilities, such as mobile devices and network appliances. The UE may maintain connections with both an overlay access node and an underlay access node and communicate with them simultaneously. For example, the overlay access node may serve the control plane traffic for the UE, and the underlay access node may serve the data plane traffic for the UE.

Examples of user equipment include, but are not limited to, a mobile phone, a smart phone, a telephone, a television, a remote controller, a set-top box, a computer monitor, a computer (including a tablet computer such as BlackBerry® Playbook tablet, a desktop computer, a handheld or laptop computer, a netbook computer), a personal digital assistant (PDA), a microwave, a refrigerator, a stereo system, a cassette recorder or player, a DVD player or recorder, a CD player or recorder, a VCR, an MP3 player, a radio, a camcorder, a camera, a digital camera, a portable memory chip, a washer, a dryer, a washer/dryer, a copier, a facsimile machine, a scanner, a multi-functional peripheral device, a wrist watch, a clock, a game device, etc. The UE 170 includes a device and a removable memory module, such as a Universal Integrated Circuit Card (UICC) that includes a Subscriber Identity Module (SIM) application, a Universal Subscriber Identity Module (USIM) application, or a Removable User Identity Module (R-UIM) application. Alternatively, the UE 170 includes the device without such a module. The term "UE" can also refer to any hardware or software component that can terminate a communication session for a user. In addition, the terms "user equipment," "UE," "user equipment device," "user agent," "UA," "user device," and "mobile device" can be used synonymously herein.

Figure 2:
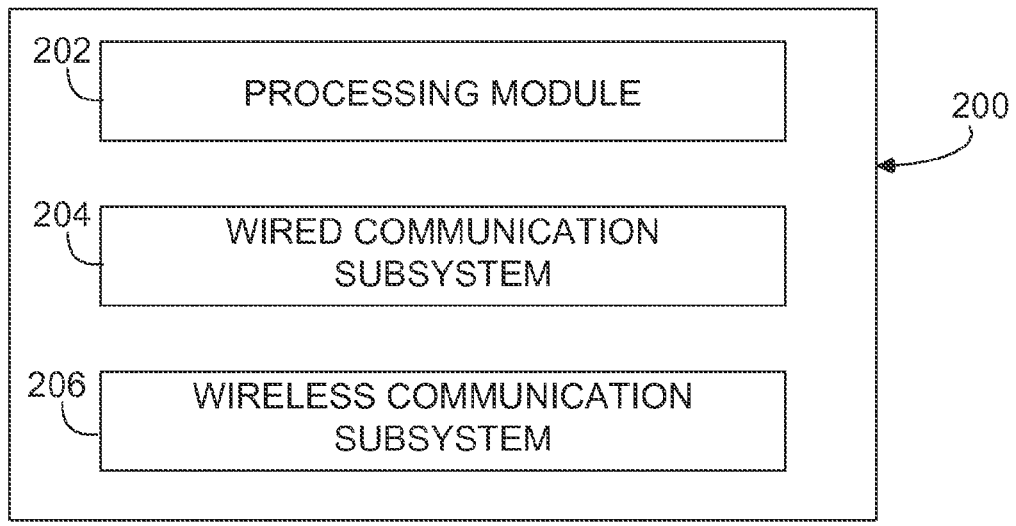
FIG. 2 illustrates an example access node device, in accordance with an embodiment of the present disclosure.

FIG. 2 illustrates an example access node device 200 consistent with certain aspects of this disclosure. The example access node device 200 includes a processing module 202, a wired communication subsystem 204, and a wireless communication subsystem 206. The processing module 202 includes one or more processing components (alternatively referred to as "processors" or "central processing units" (CPUs)) operable to execute instructions associated with managing IDC interference. The processing module 202 also includes other auxiliary components, such as random access memory (RAM), read only memory (ROM), secondary storage (for example, a hard disk drive or flash memory). Additionally, the processing module 202 executes certain instructions and commands to provide wireless or wired communication, using the wired communication subsystem 204 or a wireless communication subsystem 206. One skilled in the art will readily appreciate that various other components can also be included in the example access node device 200.

Figure 3:
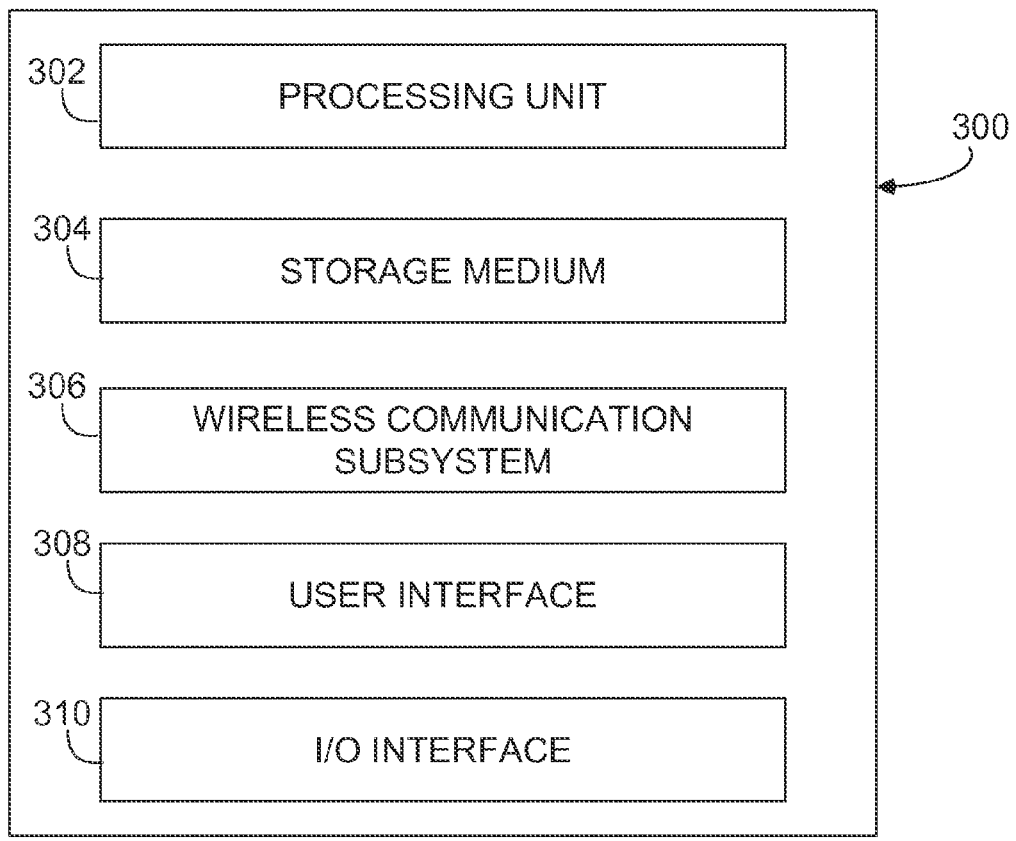
FIG. 3 illustrates an example user equipment device, in accordance with an embodiment of the present disclosure.

FIG. 3 illustrates an example user equipment device 300 consistent with certain aspects of the present disclosure. The example user equipment device 300 includes a processing unit 302, a computer readable storage medium 304 (for example, ROM or flash memory), a wireless communication subsystem 306, a user interface 308, and an I/O interface 310.

The processing unit 302 includes components and performs functions similar to the processing module 202 described with regard to FIG. 2. The wireless communication subsystem 306 is configured to provide wireless communications for data information or control information provided by the processing unit 302. The wireless communication subsystem 306 includes, for example, one or more antennas, a receiver, a transmitter, a local oscillator, a mixer, and a digital signal processing (DSP) unit. In some implementations, the wireless communication subsystem 306 can support MIMO transmissions.

The user interface 308 includes, for example, one or more of a screen or touch screen (for example, a liquid crystal display (LCD), a light emitting display (LED), an organic light emitting display (OLED), a microelectromechanical system (MEMS) display, a keyboard or keypad, a tracking device (e.g., trackball, trackpad), a speaker, and a microphone. The I/O interface 310 includes, for example, a universal serial bus (USB) interface. One skilled in the art will readily appreciate that various other components can also be included in the example UE device 300.

Figure 4A:
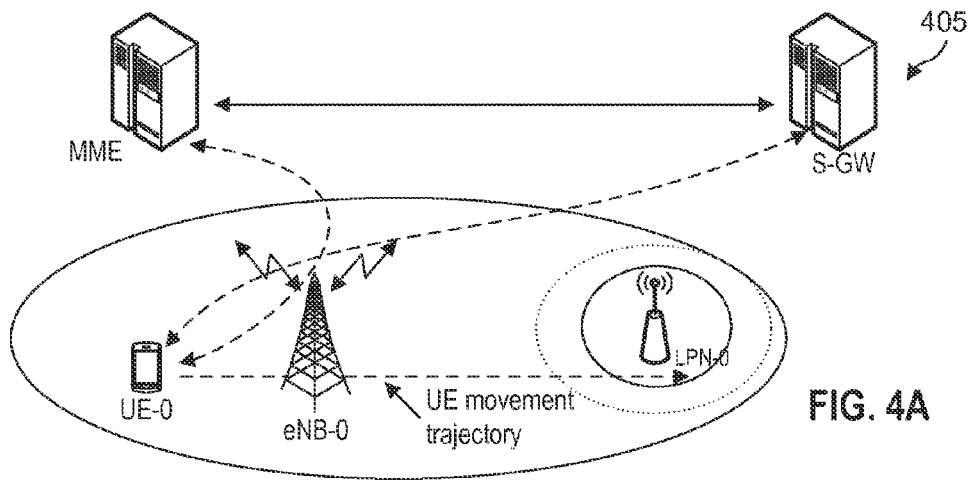
FIGS. 4A-4C illustrate an example scenario for data offloading in a heterogeneous network consistent with the present disclosure.
Figure 4B:
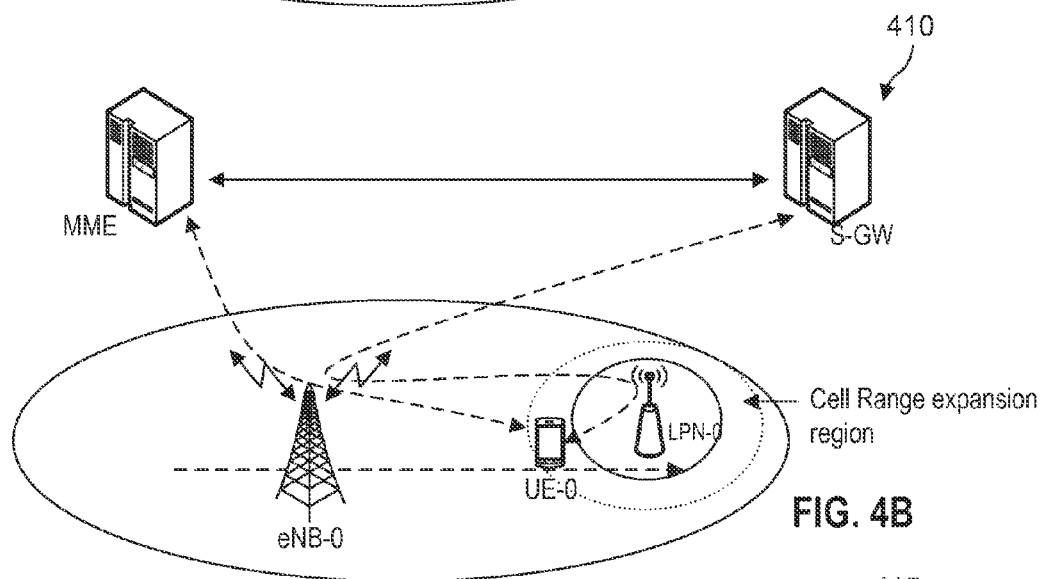
Figure 4C:
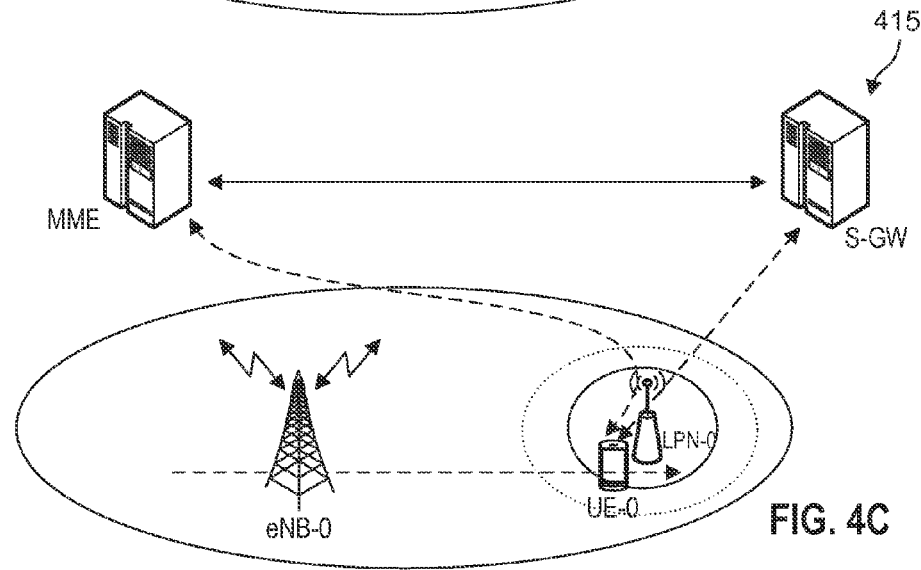

FIGS. 4A-4C illustrate an example scenario for data offloading in a heterogeneous network consistent with the present disclosure. In this example scenario, "UE-0" is initially connected to the macro eNB "eNB-0" and moving towards a low power node/cell "LPN-0". The low power cell may be a pico cell, femto cell, or a relay cell. The low power cell can be stand-alone or non-stand-alone. A stand-alone cell is a cell through which the UE can attach to the network, while a non-stand-alone cell is a cell transparent to the UE and is not capable connecting the UE to the network directly. When the low-power cell is a stand-alone cell, a UE can perform a cell search and find a cell on a frequency $f_L$ and attach to the cellular network by connecting to the cell.

FIG. 4A illustrates an example scenario 405 where the UE is located in the coverage area of macro eNB eNB-0 and connected to eNB-0. As illustrated in FIG. 4A, the UE receives/transmits the packets from/to the MME and S-GW through macro eNB eNB-0. At this point, UE-0 is only connected with eNB-0 for communication.

As UE-0 moves towards the low-power cell LPN-0, UE-0 may be instructed to transmit/receive data from the low-power cell LPN-0 but continue to maintain a radio link connection with the macro cell eNB-0. This may occur when cell range expansion (CRE) is enabled for the low power cell LPN-0 and the UE is located at the CRE region. CRE is enabled for efficient data offloading to low power cells. Note that CRE could be applied to cases of macro cell and low-power cell on the same or different frequencies. If macro cell and low-power cell are on different frequencies, CRE may be applied based on Reference Signal Received Quality (RSRQ). For example, the UE could connect to a low-power cell even if the RSRQ of the low-power cell is XdB lower than that of the macro cell, where X is the CRE bias value. In this scenario, the macro cell's downlink transmission may not cause interference to the low power cell downlink because the transmissions are on different frequencies.

FIG. 4B illustrates an example scenario 410 where the UE is connected with macro eNB eNB-0 and simultaneously connected with the low power cell LPN-0 for data offloading. The UE's serving cell is still the macro eNB, eNB-0. As illustrated, in this state, the EPC still forwards the data to UE-0 via the macro eNB, eNB-0. The control messages from the MME are transmitted to the UE directly by the macro eNB. On the other hand, the data packets from the S-GW are forwarded by the macro eNB to the low power cell LPN-0 for offloading. The low power cell LPN-0 subsequently transmits the forwarded data packets to UE-0. In this example, only data plane packets not control plane packets are being offloaded from the macro eNB, eNB-0, to the low power cell LPN-0. Similarly the UL data packets transmitted by the UE are received by the low-power cell, LPN-0, and forwarded to the serving macro eNB, eNB-0. The macro eNB subsequently forwards these packets to the SGW. While not shown in FIG. 4B, both control and data packets could be offloaded to the low power node LPN-0 while the UE remains associated with the macro eNB. The low power cell forwarding data packets to the UE may also be referred as a coordinating cell or offloading cell. Although the coordinating cell is a low power cell in this example, it should be understood that the coordinating cell can be either a low power cell or a marco cell.

In the offloading state, the UE maintains two separate cell radio network temporary identities (C-RNTIs), one assigned by the macro cell, $C_M$, and the other assigned by the low power cell, $C_L$. Furthermore, the UE may be instructed about its association duration with the coordinating cell by its serving cell. Here the serving cell is the macro cell eNB-0.

Eventually as the UE moves close to the low-power cell, it may be handed over to the low power cell. The UE could also connect to both macro and low-power cell especially if the low-power cell is a non-standalone cell.

FIG. 4C illustrates an example scenario 415 where UE-0 is handed over from the macro cell eNB-0 to the low power cell LPN-0 as UE-0 moves very close to the low power cell LPN-0. After being handed over, the UE's serving cell is changed to the low power cell LPN-0. The MME and S-GW both transfer packets from/to UE-0 via the low power cell LPN-0, and UE-0 maintains a single radio link connection with the low power cell LPN-0. Although not shown in FIG. 4C, data and/or control packets offloading may also be performed when the UE's serving cell is a low power cell.

Figure 5A:
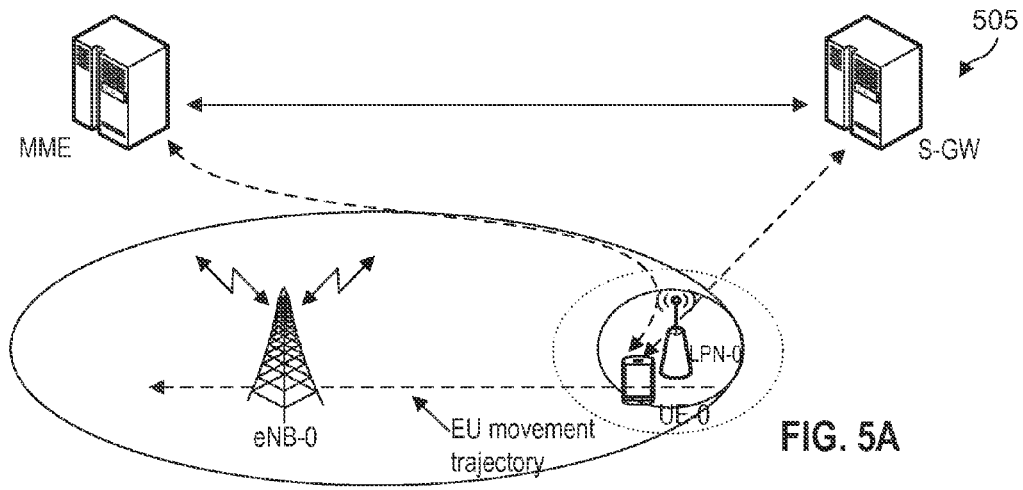
FIGS. 5A-5C illustrate an example scenario for control information offloading in a heterogeneous network consistent with the present disclosure.
Figure 5B:
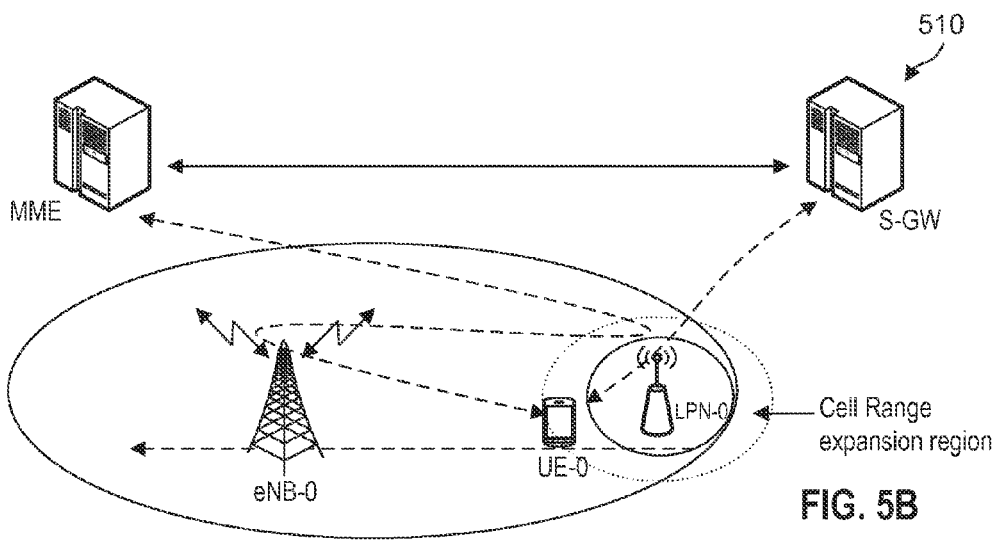
Figure 5C:
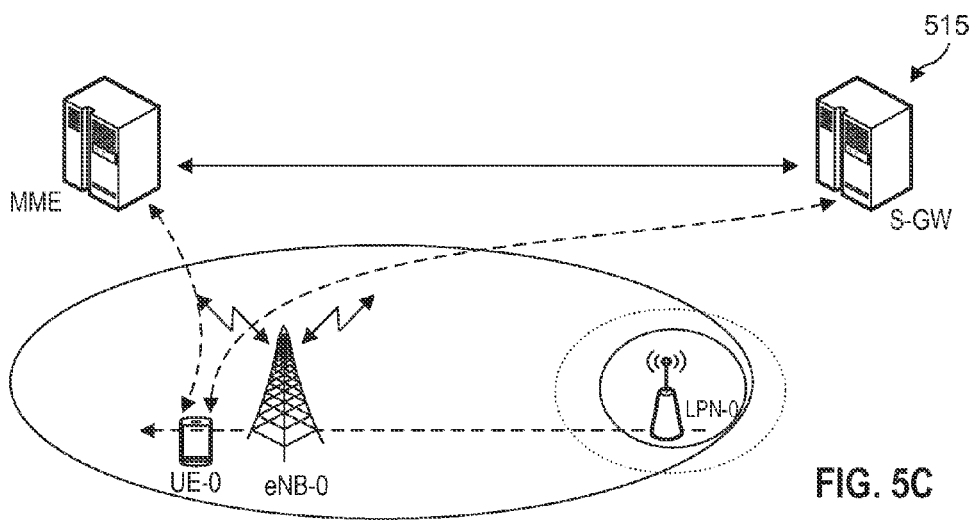

FIGS. 5A-5C illustrate an example scenario for control information offloading in a heterogeneous network consistent with the present disclosure. In this example scenario, "UE-0" is initially associated with a low power node/cell "LPN-0" and moving towards the macro eNB "eNB-0".

FIG. 5A illustrates an example scenario 505 where the UE is located in the coverage area of low power node LPN-0 and is associated with LPN-0. As illustrated in FIG. 5A, the UE receives/transmits the packets from/to the MME and S-GW through the low power node LPN-0. At this point, UE-0 is only connected with LPN-0 for communication.

As UE-0 moves towards the macro cell eNB-0, UE-0 may be instructed to transmit/receive control messages to/from the macro cell eNB-0 but continue to maintain a radio link connection with the low-power cell LPN-0. This may occur when CRE is enabled for the low power cell LPN-0 and the UE is located at the CRE region.

FIG. 5B illustrates an example scenario 510 where the UE is connected with low power cell LPN-0 and simultaneously is connected with macro eNB eNB-0 for data offloading. The UE's serving cell is still the low power cell LPN-0. As illustrated, in this state, the EPC still forwards packets to UE-0 via the low power cell LPN-0. Data packets from the S-GW are transmitted to the UE directly by low power cell LPN-0. On the other hand, control messages from the MME are forwarded by the low power cell LPN-0 to the macro eNB for control information offloading. The low macro eNB eNB-0 subsequently transmits the forwarded data packets to UE-0. In this example, only control plane packets not data plane packets are being offloaded from the low power cell LPN-0 to the macro eNB eNB-0. Similarly the control messages transmitted by the UE are received by the macro cell and forwarded to the serving low-power cell, LPN-0. The low-power cell subsequently forwards the messages to the MME. The macro eNB eNB-0 is functioning as a coordinating cell in this case, and the low power node LPN-0 remains the serving cell for the UE. The UE maintains two separate cell radio network temporary identities (C-RNTIs), one assigned by the macro cell, $C_M$, and the other assigned by the low power cell, $C_L$. Although not shown in FIG. 5B, both control and data packets could be offloaded to the macro eNB while the UE remains associated with the low power node LPN-0.

As the UE moves close to the macro eNB, eNB-0, the UE may be handed over to the macro cell and the control information offloading is ended. FIG. 5C illustrates an example scenario 515 where UE-0 is handed over from the low power cell LPN-0 to the macro cell eNB-0 as UE-0 moves very close to the macro cell eNB-0. After being handed over, the UE's serving cell is changed to the macro cell eNB-0. The MME and S-GW both transfer packets from/to UE-0 via the macro cell eNB-0, and UE-0 maintains a single radio link connection with the macro cell eNB-0. Data and/or control offloading may also be employed after the UE-0 is associated with macro cell eNB-0.

Figure 6:
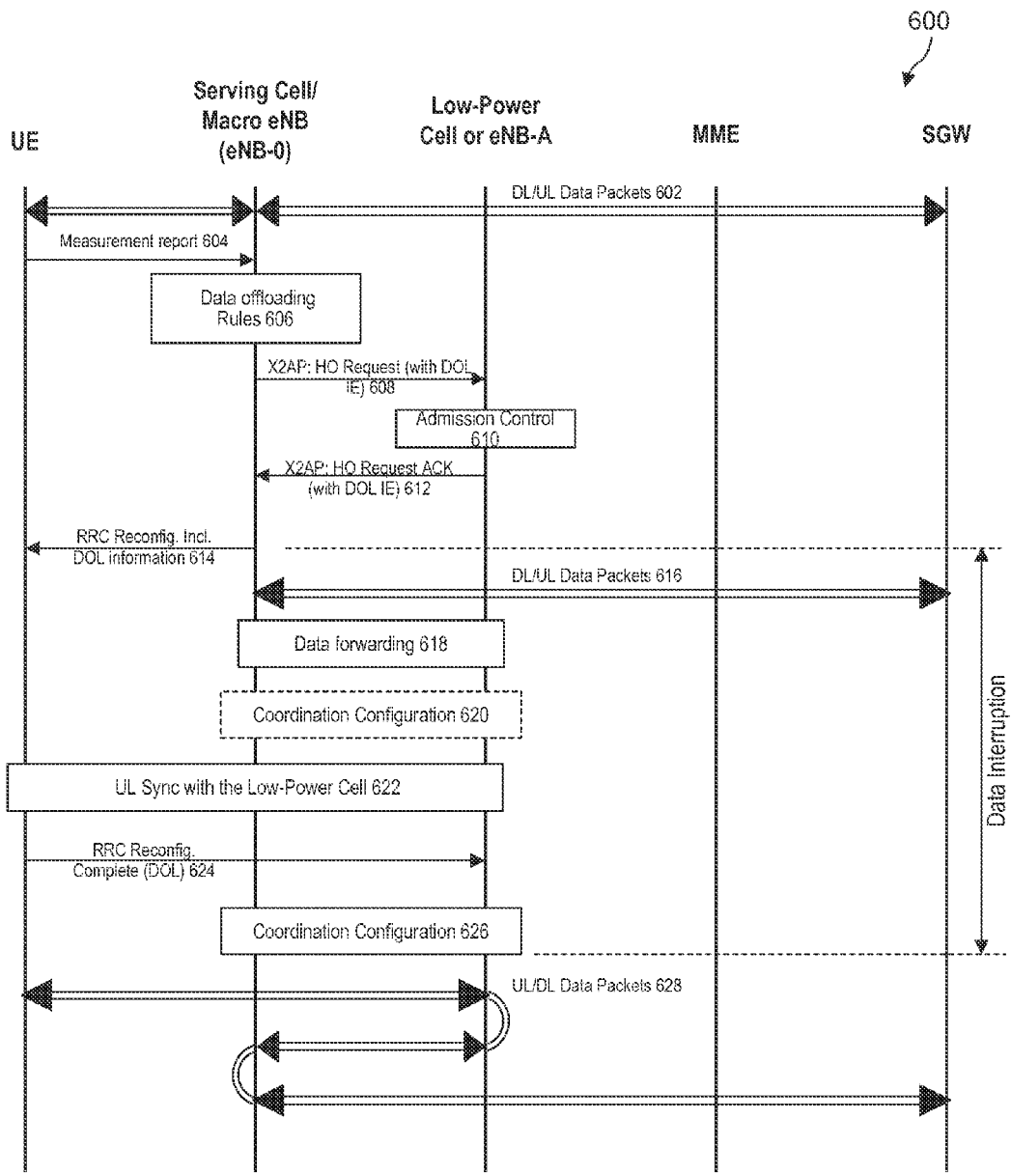
FIG. 6 illustrates an example signaling diagram for data and/or control offloading, in accordance with an embodiment of the present disclosure.

FIG. 6 is an example signaling diagram 600 for data and/or control offloading, in accordance with an embodiment of the present disclosure. In this embodiment, the UE maintains a radio link connection with a first base station, receives offloading information from the first base station, and connects with a second base station based on the offloading information, where the radio link connection with the first base station is maintained for a period of time following connection to the second base station. The illustration corresponds to the scenario where the UE is initially attached to the EPC via the macro eNB and moves towards a low power cell. The UE initially attaches to the cellular network via macro eNB eNB-0 and communicates with eNB-0 for both the data and control packets. Macro eNB eNB-0 sends the uplink data packets received from the UE to the SGW and receives the downlink data packets associated with the UE from the SGW at 602.

If eNB-0 has limited available radio resources, eNB-0 instructs the UE to scan for low power cell or any other cell on frequency $f_L$ in order to potentially select a low-power cell in the UE's vicinity operating on frequency $f_L$. At 604, the UE is triggered to send a measurement report by the rules set by the system information, specification, etc. In some implementations, the measurement reporting trigger may be set to enable a data and/or control offloading procedure. For example, the UE may be triggered to send a measurement report upon receiving a request from its serving eNB for initiating data and/or control offloading.

At 606, the serving cell, eNB-0, makes data and/or control offloading (DOL) decisions. The DOL decisions could be data offloading, control offloading, data and control offloading, or no offloading to a coordinating eNB. For example, the serving cell may select an appropriate coordinating cell for DOL, based on the measurement report received from the UE, load condition of the source cell and measured cell(s), etc. A source cell refers to the cell which initiates a handover or offloading procedure. A target cell refers to the cell which the UE is being handed over to.

After a coordinating cell is identified by the serving cell, the source cell issues a handover request to the coordinating cell at 608, for example, an X2AP (X2 application protocol): HANDOVER REQUEST message including DOL information element (IE). The handover request message includes necessary information to prepare the handover at a target cell. An example handover request message including the DOL information element is illustrated in Table 1. A detailed description of information elements in the handover request message can be found in 3rd generation partnership project (3GPP), technical specification (TS), 36.423, version 11.0.0, "X2 Application Protocol (X2AP)," which is incorporated here by reference.

TABLE 1

Handover Request Message with DOL Information Element

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | reject |
| Cause | M | | 9.2.6 | | YES | ignore |
| Target Cell ID | M | | ECGI 9.2.14 | | YES | reject |
| GUMMEI | M | | 9.2.16 | | YES | reject |
| UE Context Information | | 1 | | | YES | reject |
| >MME UE S1AP ID | M | | INTEGER (0..2$^{32}$ − 1) | MME UE S1AP ID allocated at the MME | — | — |
| >UE Security Capabilities | M | | 9.2.29 | | — | — |
| >AS Security Information | M | | 9.2.30 | | — | — |
| >UE Aggregate Maximum Bit Rate | M | | 9.2.12 | | — | — |

TABLE 1-continued

Handover Request Message with DOL Information Element

| IE/Group Name | Presence | Range | IE type and reference | Semantics description | Criticality | Assigned Criticality |
|---|---|---|---|---|---|---|
| >Subscriber Profile ID for RAT/Frequency priority | O | | 9.2.25 | | — | — |
| >Control/Data offloading | O | | Described below | Decided by the source eNB | — | ignore |
| >E-RABs To Be Setup/offload List | | 1 | | | — | — |
| >>E-RABs To Be Setup Item | | 1 . . . <maxnoof Bearers> | | | EACH | ignore |
| >>>E-RAB ID | M | | 9.2.23 | | — | — |
| >>>E-RAB Level QoS Parameters | M | | 9.2.9 | Includes necessary QoS parameters | — | — |
| >>>DL Forwarding | O | | 9.2.5 | | — | — |
| >>>UL GTP Tunnel Endpoint | M | | GTP Tunnel Endpoint 9.2.1 | SGW endpoint of the S1 transport bearer. For delivery of UL PDUs. | — | — |
| >Bandwidth for control signalling | O | | Described below | | | ignore |
| >RRC Context | M | | OCTET STRING | Includes the RRC Handover/DOL Preparation Information message as defined in subclause 10.2.2 of TS 36.331 [9]. | — | — |
| >Handover Restriction List | O | | 9.2.3 | | — | — |
| >Location Reporting Information | O | | 9.2.21 | Includes the necessary parameters for location reporting | — | — |
| >Management Based MDT Allowed | O | | 9.2.59 | | YES | ignore |
| UE History Information | M | | 9.2.38 | Same definition as in TS 36.413 [4]. | YES | ignore |
| Trace Activation | O | | 9.2.2 | | YES | ignore |
| SRVCC Operation Possible | O | | 9.2.33 | | YES | ignore |
| CSG Membership Status | O | | 9.2.52 | | YES | reject |

The data and/or control offloading IE included in the handover request message indicates to a target cell whether the handover request message is sent to offload the control/data temporarily. An example data and/or control offloading IE is illustrated in Table 2.

TABLE 2

Data and/or control Offloading IE

| IE/Group Name | Presence | Range | IE Type and Reference | Semantics Description |
|---|---|---|---|---|
| Control/Data offloading flag | M | | ENUMERATED (0, 1, 2) | 0—proceed with HO 1—Control 2—Data |

As shown in Table 2, the control/data offloading field indicates whether the serving cell requesting "data offloading" or "control offloading". If the field indicates "data offloading", the following "UE Context field" lists the E-UTRAN Radio Access Bearers (E-RABs) requested to be offloaded. Otherwise this field may be empty. When the data and/or control offloading field is set to a non-zero value, the eNB receiving this message will not initiate the path switch procedure with the EPC after receiving the radio resource control (RRC) Reconfiguration complete message from the UE.

If the serving eNB decides to cancel the data offloading for some reason, the serving eNB may send a message, for example, a handover cancellation message to the coordinating eNB. An example handover cancellation message is illustrated in Table 3. A detailed description of information elements in the handover cancellation message can be found in 3GPP, TS 36.423.

TABLE 3

Handover Cancellation Message

| IE/Group Name | Presence | Range | IE type and reference | Semantics description | Criticality | Assigned Criticality |
|---|---|---|---|---|---|---|
| Message Type | M | | 9.2.13 | | YES | ignore |
| Old eNB UE X2AP ID | M | | eNB UE X2AP ID 9.2.24 | Allocated at the source eNB | YES | reject |

TABLE 3-continued

Handover Cancellation Message

| IE/Group Name | Presence | Range | IE type and reference | Semantics description | Criticality | Assigned Criticality |
|---|---|---|---|---|---|---|
| New eNB UE X2AP ID | O | | eNB UE X2AP ID 9.2.24 | Allocated at the target eNB | YES | ignore |
| >Control/Data offloading | O | | Described previously | Decided by the source eNB | — | ignore |
| Cause | M | | 9.2.6 | | YES | ignore |

Admission control may be performed by the coordinating cell at 610 after receiving the handover request message. The coordinating cell may be a macro cell or a low power cell. If the data and/or control offloading flag in the DOL IE is set to 2, i.e., data offloading is requested, the required radio resources are computed by the coordinating eNB for each E-RAB based on the provided quality of service (QoS) information. If the radio resources are available, the coordinating cell may configure the required resources according to the received E-RAB QoS information and reserves a C-RNTI and optionally a random access channel (RACH) preamble for the UE. The access stratum (AS) configuration to be used in the coordinating cell can either be specified independently (e.g., an "establishment") or as a delta compared to the AS configuration used in the source cell (e.g., a "reconfiguration"). If the data and/or control offloading flag is set to 1, i.e., control offloading is requested, the coordinating eNB may evaluate the required bandwidth for control signaling and respond to the source cell accordingly.

At 612, the coordinating cell sends a handover request acknowledgement message to the source cell, for example, an X2AP: HANDOVER REQUEST ACKNOWLEDGE message including the DOL IE. The handover request acknowledge message may include a transparent container to be sent to the UE as a RRC message to perform the data and/or control offloading. The container may include a C-RNTI associated with the coordinating cell security algorithm identifiers for the selected security algorithms. The container may also include a dedicated RACH preamble and other parameters such as access parameters, system information blocks (SIBs), etc. The handover request acknowledge message may also include radio network layer (RNL) and transport network layer (TNL) information for the forwarding tunnels. In addition, the coordinating eNB generates the RRC message to perform the DOL, e.g., a RRC-ConnectionReconfiguration message including the mobilityControlInformation, to be sent by the source eNB towards the UE. An example handover request acknowledgement message with the DOL IE is illustrated in Table 4. A detailed description of information elements in the handover request acknowledgement message can be found in 3GPP, TS 36.423.

TABLE 4

Handover Request Acknowledge Message

| IE/Group Name | Presence | Range | IE type and reference | Semantics description | Criticality | Assigned Criticality |
|---|---|---|---|---|---|---|
| Message Type | M | | 9.2.13 | | YES | reject |
| Old eNB UE X2AP ID | M | | eNB UE X2AP ID 9.2.24 | Allocated at the source eNB | YES | ignore |
| New eNB UE X2AP ID | M | | eNB UE X2AP ID 9.2.24 | Allocated at the target eNB | YES | ignore |
| Control/Data offloading | O | | Described below | Decided by the target Cell | — | ignore |
| E-RABs Admitted List | | 1 | | | YES | ignore |
| > E-RABs Admitted Item | | 1 ... <maxnoof Bearers> | | | EACH | ignore |
| >> E-RAB ID | M | | 9.2.23 | | — | — |
| >> UL GTP Tunnel Endpoint | O | | GTP Tunnel Endpoint 9.2.1 | Identifies the X2 transport bearer used for forwarding of UL PDUs | — | — |
| >> DL GTP Tunnel Endpoint | O | | GTP Tunnel Endpoint 9.2.1 | Identifies the X2 transport bearer. used for forwarding of DL PDUs | — | — |
| E-RABs Not Admitted List | O | | E-RAB List 9.2.28 | a value for E-RAB ID shall only be present once in E-RABs Admitted List IE + in E-RABs Not Admitted List IE | YES | ignore |

TABLE 4-continued

| | | | Handover Request Acknowledge Message | | | |
|---|---|---|---|---|---|---|
| IE/Group Name | Presence | Range | IE type and reference | Semantics description | Criticality | Assigned Criticality |
| Target eNB To Source eNB Transparent Container | M | | OCTET STRING | Includes the RRC E-UTRA Handover Command message as defined in subclause 10.2.2 in TS 36.331 [9]. | YES | ignore |
| Criticality Diagnostics | O | | 9.2.7 | | YES | ignore |

After receiving the handover request acknowledgement message, the serving eNB transmits a handover command to the UE at 614, for example, the serving eNB transmits an RRC connection reconfiguration message including the data and/or control offloading flag. The RRCConnectionReconfiguration message is a command to modify an RRC connection. It may convey information for measurement configuration, mobility control, radio resource configuration, associated dedicated NAS information, and security configuration. When the data and/or control offloading flag is enabled, the UE will maintain the RRC_connected status with the serving cell. An example RRC Connection Reconfiguration message is illustrated in Table 5. A detailed description of information elements in the RRC Connection Reconfiguration message can be found in 3GPP, TS 36.331, version 11.0.0, "Radio Resource Control (RRC); Protocol specification," which is incorporated here by reference.

TABLE 5

RRCConnectionReconfiguration message

```
-- ASN1START
RRCConnectionReconfiguration ::=         SEQUENCE {
    rrc-TransactionIdentifier            RRC-TransactionIdentifier,
    criticalExtensions                   CHOICE {
        c1                                   CHOICE{
            rrcConnectionReconfiguration-r8      RRCConnectionReconfiguration-r8-IEs,
            spare7 NULL,
            spare6 NULL, spare5 NULL, spare4 NULL,
            spare3 NULL, spare2 NULL, spare1 NULL
        },
        criticalExtensionsFuture             SEQUENCE { }
    }
}
RRCConnectionReconfiguration-r8-IEs ::= SEQUENCE {
    measConfig                           MeasConfig                              OPTIONAL,  --
Need ON
    mobilityControlInfo                  MobilityControlInfo                     OPTIONAL,  --
Cond HO
    dedicatedInfoNASList                 SEQUENCE (SIZE(1..maxDRB)) OF
                                             DedicatedInfoNAS                    OPTIONAL,  --
Cond nonHO
    radioResourceConfigDedicated         RadioResourceConfigDedicated            OPTIONAL,  -- Cond
HO-toEUTRA
    securityConfigHO                     SecurityConfigHO                        OPTIONAL,  --
Cond HO
    nonCriticalExtension                 RRCConnectionReconfiguration-v890-IEs   OPTIONAL
}
RRCConnectionReconfiguration-v890-IEs ::= SEQUENCE {
    lateNonCriticalExtension             OCTET STRING                            OPTIONAL,  --
Need OP
    nonCriticalExtension                 RRCConnectionReconfiguration-v920-IEs
    OPTIONAL
}
RRCConnectionReconfiguration-v920-IEs ::= SEQUENCE {
    otherConfig-r9                       OtherConfig-r9                          OPTIONAL,  --
Need ON
    fullConfig-r9                        ENUMERATED {true}                       OPTIONAL,  --
Cond HO-Reestab
    nonCriticalExtension                 RRCConnectionReconfiguration-v1020-IEs
    OPTIONAL
}
RRCConnectionReconfiguration-v1020-IEs ::= SEQUENCE {
    sCellToReleaseList-r10               SCellToReleaseList-r10                  OPTIONAL,  --
Need ON
    sCellToAddModList-r10                SCellToAddModList-r10                   OPTIONAL,  --
Need ON
```

TABLE 5-continued

| RRCConnectionReconfiguration message | | | |
|---|---|---|---|
| nonCriticalExtension | RRCConnectionReconfiguration-vxxxx-IEs | | |
| OPTIONAL | | | |
| } | | | |
| RRCConnectionReconfiguration-vxxxx-IEs ::= SEQUENCE { | | | |
|     DOL flag | ENUMERATED {TRUE} | OPTIONAL, | -- |
| Need ON | | | |
|     nonCriticalExtension | SEQUENCE { } | OPTIONAL | -- |
| Need OP | | | |
| } | | | |
| SCellToAddModList-r10 ::= | SEQUENCE (SIZE (1..maxSCell-r10)) OF SCellToAddMod-r10 | | |
| SCellToAddMod-r10 ::= | SEQUENCE { | | |
|     sCellIndex-r10 | SCellIndex-r10, | | |
|     cellIdentification-r10 | SEQUENCE { | | |
|         physCellId-r10 | PhysCellId, | | |
|         dl-CarrierFreq-r10 | ARFCN-ValueEUTRA | | |
|     } | | OPTIONAL, | -- Cond |
| SCellAdd | | | |
|     radioResourceConfigCommonSCell-r10 | RadioResourceConfigCommonSCell-r10 OPTIONAL, | | |
|     radioResourceConfigDedicatedSCell-r10 | RadioResourceConfigDedicatedSCell-r10 | | |
|     OPTIONAL,  -- Cond SCellAdd2 | | | |
|     ... | | | |
| } | | | |
| SCellToReleaseList-r10 ::= | SEQUENCE (SIZE (1..maxSCell-r10)) OF SCellIndex-r10 | | |
| SecurityConfigHO ::= | SEQUENCE { | | |
|     handoverType | CHOICE { | | |
|         intraLTE | SEQUENCE { | | |
|             securityAlgorithmConfig | SecurityAlgorithmConfig | OPTIONAL, | - |
| - Cond fullConfig | | | |
|             keyChangeIndicator | BOOLEAN, | | |
|             nextHopChainingCount | NextHopChainingCount | | |
|         }, | | | |
|         interRAT | SEQUENCE { | | |
|             securityAlgorithmConfig | SecurityAlgorithmConfig, | | |
|             nas-SecurityParamToEUTRA | OCTET STRING (SIZE(6)) | | |
|         } | | | |
|     }, | | | |
|     ... | | | |
| } | | | |
| -- ASN1STOP | | | |

At 616, the serving gateway continues to transmit/receive downlink/uplink data packets associated with the UE to the serving cell eNB-0. The serving eNB starts transmitting the unacknowledged data packets to the coordinating eNB over the X2_U interface at 618. The serving cell and the coordinating cell may perform a coordination configuration procedure at 620.

After receiving the RRCConnectionReconfiguration message including the mobilityControlInformation, the UE performs synchronization procedure with respect to the coordinating eNB at 622. The UE accesses the coordinating cell via RACH, following a contention-free procedure if a dedicated RACH preamble was indicated in the mobilityControlInformation, or following a contention-based procedure if no dedicated preamble was indicated. The UE derives coordinating eNB specific keys and configures the selected security algorithms to be used in the target cell. The coordinating eNB responds with uplink allocation and timing advance command.

When the UE has successfully accessed the coordinating cell, the UE sends a message to the coordinating cell at 624 to confirm the DOL. For example, the UE sends a RRC Connection Reconfiguration Complete message using the assigned C-RNTI, along with an uplink Buffer Status Report, whenever possible, to the coordinating eNB to indicate that the handover procedure is completed for the UE. The RRC Connection Reconfiguration Complete message includes a DOL confirmation flag.

The coordinating eNB verifies the C-RNTI sent in the RRC Connection Reconfiguration Complete message. If the RRC Connection Reconfiguration Complete message from the UE is successfully validated, and the DOL confirmation flag is enabled, the coordinating eNB will a perform coordination configuration procedure with the source eNB at 626. Subsequently, the uplink and downlink data packets 628 associated with the UE are routed through the serving eNB and the coordinating eNB to the serving gateway. If the DOL confirmation flag in the RRC Connection Reconfiguration Complete message is enabled, the target eNB may not send a S1AP: PATH SWITCH message to MME to inform that the UE has changed cells. An example RRC Connection Reconfiguration Complete Message is illustrated in Table 6.

TABLE 6

| RRCConnectionReconfigurationComplete message |
|---|
| -- ASN1START |
| RRCConnectionReconfigurationComplete ::= SEQUENCE { |
|     rrc-TransactionIdentifier     RRC-TransactionIdentifier, |
|     criticalExtensions     CHOICE { |

TABLE 6-continued

RRCConnectionReconfigurationComplete message

```
        rrcConnectionReconfigurationComplete-r8
                            RRCConnectionReconfigurationComplete-r8-IEs,
        criticalExtensionsFuture    SEQUENCE { }
    }
}
RRCConnectionReconfigurationComplete-r8-IEs ::= SEQUENCE {
    nonCriticalExtension    RRCConnectionReconfigurationComplete-v8a0-IEs
    OPTIONAL
}
RRCConnectionReconfigurationComplete-v8a0-IEs ::= SEQUENCE {
    lateNonCriticalExtension  OCTET STRING                            OPTIONAL,
    nonCriticalExtension      RRCConnectionReconfigurationComplete-v1020-IEs
    OPTIONAL
}
RRCConnectionReconfigurationComplete-v1020-IEs ::= SEQUENCE {
    rlf-InfoAvailable-r10    ENUMERATED {true}           OPTIONAL,
    logMeasAvailable-r10     ENUMERATED {true}           OPTIONAL,
    nonCriticalExtension     RRCConnectionReconfigurationComplete-vxxxx-IEs
    OPTIONAL
}
RRCReconfigurationComplete-rxxxx-IEs ::= SEQUENCE {
    DOL flag              ENUMERATED {TRUE}
    nonCriticalExtension  SEQUENCE { }
}
-- ASN1STOP
```

Figure 7:
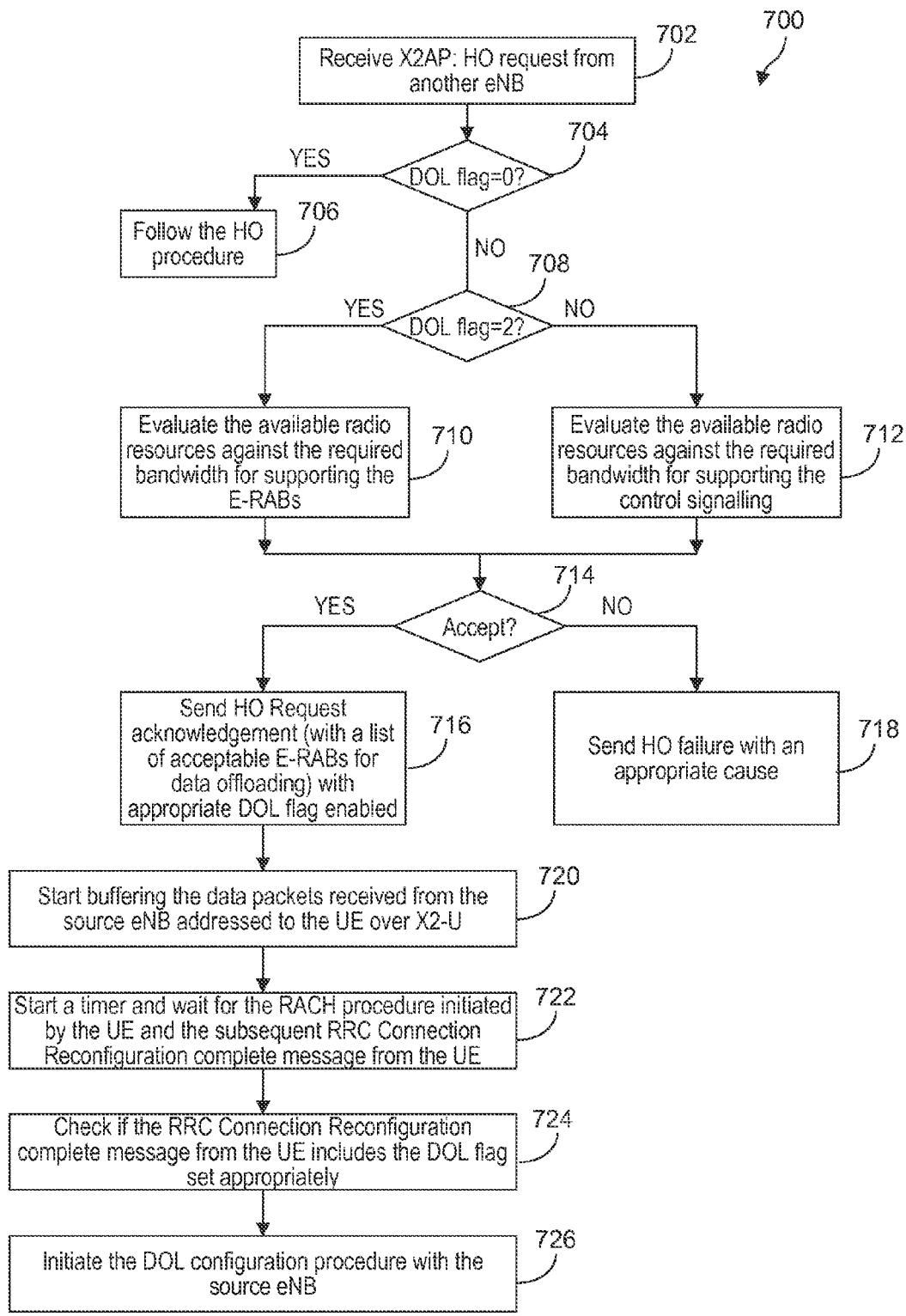
FIG. 7 illustrates a flow diagram of an example method performed by a coordinating base station for data and/or control offloading, in accordance with an embodiment of the present disclosure.

FIG. 7 illustrates a flow diagram of an example method 700 performed by a coordinating base station for data and/or control offloading, in accordance with an embodiment of the present disclosure. The coordinating eNB receives a handover request message from another eNB, for example, over an X2 interface at 702. Next, the coordinating eNB checks the value of data and/or control offloading flag included in the data and/or control offloading information element of the handover request message. If the coordinating eNB determines that the data and/or control offloading flag is set to zero or the handover request message does not include the DOL flag at 704, that is, the data and/or control offloading flag is not enabled, the coordinating eNB follows a regular handover procedure at 706. In other words, the coordinating eNB will not perform data and/or control offloading but only perform a handover procedure if applicable. On the other hand, if the data and/or control offloading flag is not set to zero at 704, that is, the data and/or control offloading flag is enabled, the coordinating eNB proceeds to check whether the data and/or control offloading flag is set to a value of two at 708. If the value of the DOL flag is set to be two, e.g., data offloading is requested, the coordinating eNB then evaluates the available radio resources against the required bandwidth for supporting the E-RABs at 710. If the value of the DOL flag is not set to be two, e.g., control offloading is requested, the coordinating eNB then evaluates the available radio resources against the required bandwidth for supporting the control signaling at 712. It should be understood that the value of the DOL flag in the example method can be set differently from this example to indicate whether data and/or control offloading is requested without departing from the scope of the present disclosure.

The coordinating eNB determines whether to accept the data and/or control offloading request at 714. If the coordinating eNB determines not to accept the data and/or control offloading request at 714, at 718, it may send a handover failure message with an appropriate cause to the other eNB which the handover request message is received from. On the other hand, if the offloading request is accepted, at 716, the coordinating eNB sends a handover request acknowledgement message to the other eNB which the handover request message is received from. The handover request acknowledgement message may include a list of acceptable E-RABs for data offloading. The handover request acknowledgement message may include a DOL flag set to indicate the type of accepted offloading, e.g., data offloading, control offloading, etc.

Subsequently, the coordinating eNB starts buffering the data packets addressed to the UE received from the source eNB, for example over the X2-U interface, at 720. The coordinating eNB may start a timer for the RACH procedure initiated by the UE and the subsequent RRC Connection Reconfiguration Complete message from the UE at 722. If the RACH procedure is not initiated by the UE when the timer expires, the coordinating eNB may clear the buffer and release the scheduled radio resources for the data and/or control offloading. Similarly, if the RRC Connection Reconfiguration Complete message is not received from the UE when the timer expires, the coordinating eNB may clear the buffer and release the scheduled radio resources for the data and/or control offloading.

If the RRC Connection Reconfiguration Complete message is received within a certain duration of time, the coordinating eNB checks the DOL flag included in the RRC Connection Reconfiguration Complete message at 724. If the DOL flag is set appropriately, for example, the DOL flag in the RRC Connection Reconfiguration Complete message is set to a same value as the DOL flag in the handover request acknowledgement message, the coordinating eNB initiates the data and/or control offloading procedure with the source eNB at 726. The coordinating eNB also starts forwarding the offloaded data and/or control packets to the UE subsequently.

The above method illustrated in FIG. 7 is for data and/or control offloading from a serving eNB to a coordinating eNB. As the UE moves away from the serving eNB and the signal quality with the serving cell deteriorates, eventually a serving cell handover will occur for the UE to associate with another cell as its serving cell.

Figure 8:
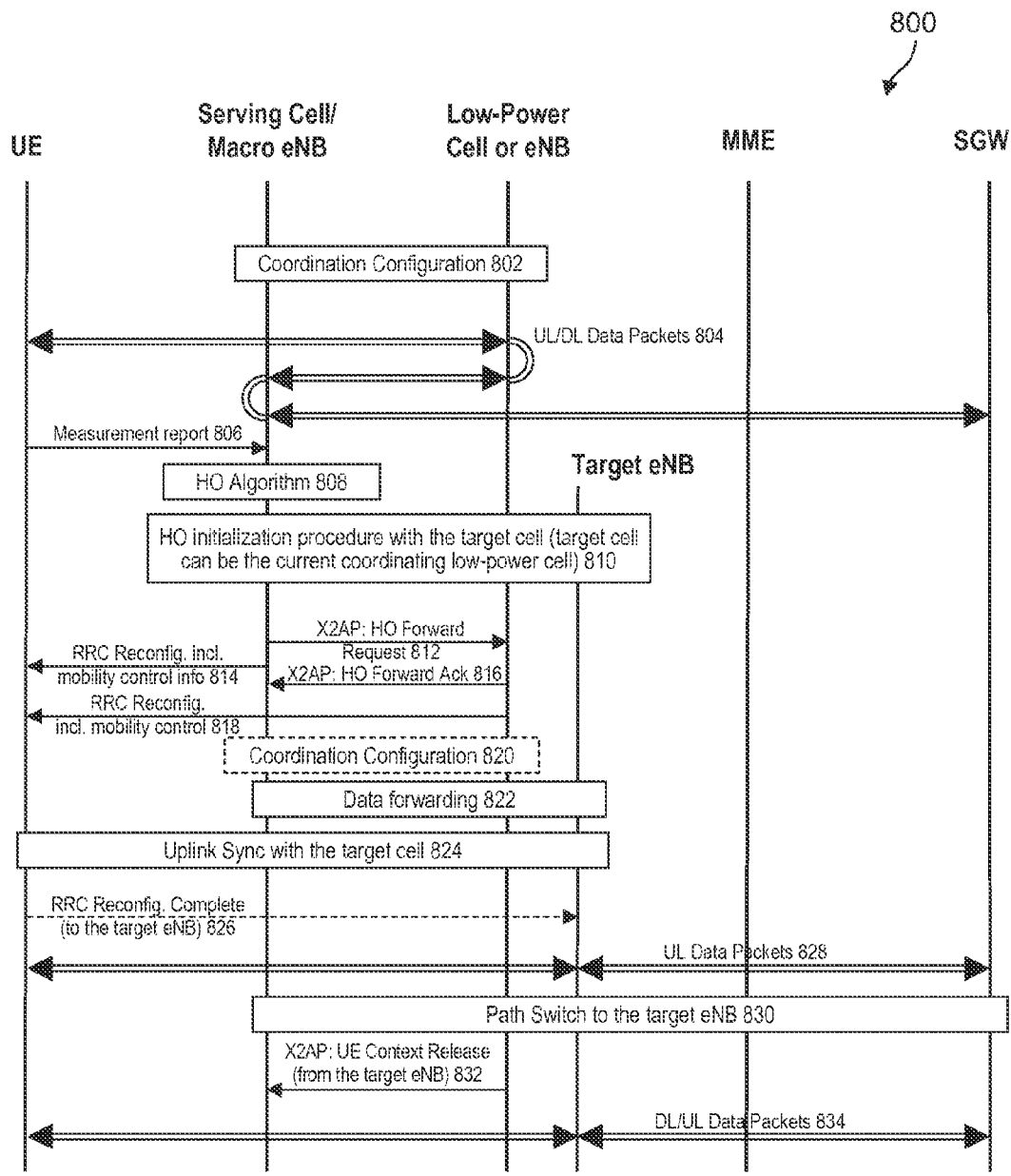
FIG. 8 illustrates an example signaling diagram for handover to a target base station, in accordance with an embodiment of the present disclosure.

FIG. 8 illustrates an example signaling diagram 800 for handover to a target base station, in accordance with an embodiment of the present disclosure. In this embodiment, the UE sends a measurement report to a first base station, receives a radio resource control (RRC) connection reconfiguration message from at least one other base station, and connects to a second base station based on the RRC connection reconfiguration message.

The UE is initially connected with the serving cell macro eNB. At 802, the macro eNB and low power eNB perform coordination configuration for data offloading. During this coordination configuration, the coordinating cells and the serving cell may exchange the parameters useful for successful data-offloading. For example, the neighbour cell list may be exchanged between the coordinating cells and the serving cell. Subsequently, uplink and downlink data packets 804 addressed from/to the UE are routed through the low power eNB for the purpose of data offloading. In other words, the macro cell is the UE's serving cell and the low power cell is the coordinating cell.

At 806, the UE may send a measurement report to the macro cell if the condition for reporting event is met. For measurement report, the UE may receive independent event thresholds for all the coordinating cells. These parameters may be received from one or all of the coordinating cells independently. For example, in one scenario, when the UE is moving from the macro cell towards a low power cell, the RRC connection reconfiguration message from the macro cell may also include the reporting event thresholds for both the cells. When triggering the measurement reporting trigger, the UE checks the event condition for both the coordinating cells. For example, for an A3 event, the reporting event is evaluated with respect to all the neighbors of the coordinating cells. The measurement report may also include a cell that was not in the neighbor list of the coordinating cell or serving cell.

If the condition of the event is satisfied with respect to one of the coordinating cells, the UE may send the measurement report to the cell with the best coverage, for example, the macro cell. In some implementations, the measurement report may be sent to the cell with which UE has better uplink signal quality and/or less transmit power. In one approach, the UE may autonomously select the cell to which it will send the measurement report. It should be understood that the above described measurement report procedure is applicable to a carrier aggregation (CA) or non-CA capable UE when it is connected to a macro cell and a low power cell simultaneously. When cell-range expansion is enabled for the low-power cells, CRE parameter should be taken into account when the metric for reporting event is evaluated.

After receiving the measurement report from the UE, the serving eNB may execute a handover algorithm at 808 to determine whether to handover the UE to another eNB, i.e., a target cell. Subsequently, the serving eNB starts a handover initialization procedure with the target cell at 810. The target cell can be the current coordinating low power cell and can also be any other cells that the UE has a good radio link connection quality with. At 812, the serving cell sends a handover forward request message to the coordinating cell, for example, over the X2 interface. An example handover forward request message is illustrated in Table 7. A detailed description of information elements in the handover forward request message can be found in 3GPP, TS 36.423.

TABLE 7

Handover Forward Request Message

| IE/Group Name | Presence | Range | IE type and reference | Semantics description | Criticality | Assigned Criticality |
|---|---|---|---|---|---|---|
| Message Type | M | | 9.2.13 | | YES | reject |
| Serving eNB UE X2AP ID | M | | eNB UE X2AP ID 9.2.24 | Allocated at the source eNB | YES | reject |
| Cause | M | | 9.2.6a | | YES | ignore |
| Coordinating eNB UE X2AP ID | M | | eNB UE X2AP ID 9.2.24 | Allocated at the coordinating eNB | YES | reject |
| UE Context Information | | 1 | | | YES | reject |
| >RRC Context | M | | OCTET STRING | Includes the RRC Reconfiguration message with the mobility control information as scheduled to be transmitted from the macro cell to the UE. | — | — |

The serving eNB sends a message, for example, a RRC Connection Reconfiguration message to the UE at 814. The RRC Connection Reconfiguration message includes mobility control information for the UE to connect with a target cell for handover. The coordinating eNB sends a handover forward acknowledgement message to the serving eNB at 816. The coordinating eNB also sends a message, for example, a RRC Connection Reconfiguration message to the UE at 818. The RRC Connection Reconfiguration message includes mobility control information for the UE to connect with a target cell for handover.

As shown in FIG. 8, the RRC connection reconfiguration message, which is also referred to as a handover command, to the UE is independently scheduled and sent from both the serving cell and the coordinating cell. By sending the same message from both cells, the probability of radio link failure is reduced. The probability radio link failure $p_\epsilon$ in this case can be expressed as $p_\epsilon = p_\epsilon(M)p_\epsilon(L)$, where $p_\epsilon(M)$ represents the probability of radio link failure with respect to the macro cell and $p_\epsilon(L)$ represents the probability of radio link failure rate with respect to the coordinating cell, i.e., the low power cell. If the UE successfully receives both RRC reconfiguration messages, in one approach, the UE may rely on the first RRC reconfiguration message it receives to initiate a connection with the target cell in order to reduce handover delay.

Another coordination configuration may be performed between the serving cell and the coordinating cell at 820. The serving cell may start data forwarding to the target cell at 822. After receiving the handover command, for example, the RRCConnectionReconfiguration message including the mobilityControlInformation, the UE performs uplink synchronization with the target eNB at 824. The UE accesses the target cell via RACH, following a contention-free procedure if a dedicated RACH preamble was indicated in the mobilityControlInformation, or following a contention-based procedure if no dedicated preamble was indicated.

When the UE has successfully accessed the target cell, the UE sends a message to the target eNB at 826 to indicate that the handover procedure is completed for the UE, for example, the UE sends a RRC Connection Reconfiguration Complete message. The target eNB receives the RRC Connection Reconfiguration Complete message and starts forwarding the uplink data packets 828 received from the UE to the serving gateway. At 830, The target eNB sends a path switch message, for example, an S1AP: PATH SWITCH message, to MME to inform that the UE has changed cells. The MME sends an update request message, for example, an UPDATE USER PLANE REQUEST message, to the Serving Gateway. The Serving Gateway switches the downlink data path associated with the UE to the target cell. The serving gateway sends an update request response, for example, an UPDATE USER PLANE RESPONSE message, to MME. The MME confirms the path switch message with an acknowledgement message, for example, a PATH SWITCH ACKNOWLEDGE message. The target eNB starts making the scheduling decisions on the new packets received from this point.

At 832, the target eNB sends a context release message, for example, an X2AP: UE CONTEXT RELEASE message, to the source eNB. By sending the UE context release message, the target eNB informs the success of handover to the source eNB. The target eNB sends this message after the S1AP: PATH SWITCH ACKNOWLEDGE message is received from the MME. Upon the successful handover, the UE is associated with the target cell, and uplink and downlink data packets 834 addressed to the UE are transferred between the target cell and the serving gateway.

In some implementations, a UE in a RRC connected state with its serving cell may monitor the neighbor cells for RRC Connection Reconfiguration message if it determines that radio link failure has occurred. UE may select the list of the neighbor cells based on the downlink signal quality measurements with respect to the neighbor cells and criteria defined by the serving cell. This list may also be provided by the network. The serving cell may indicate neighbor cell selection criteria beforehand. For example, neighbor cells with respect to which the reference signal receive quality (RSRQ), or reference signal receive power (RSRP), or a function of both RSRQ and RSRP, is above a certain threshold may be selected. The threshold on RSRQ and RSRP will be provided to the UE by the network beforehand. The serving cell may forward the handover command to the candidate neighbor cells beforehand so that this message may be transmitted when requested. In this implementation, the candidate neighbor cell is not necessarily one of the coordinating cells for the UE. After determining that the radio link failure has occurred, the UE will try to listen to the one or more of the candidate neighbor cells within a specified time period for RRC Connection Reconfiguration message. The specified time period may be signaled by the network or preconfigured by the relevant standards. The time to listen to the neighbor cells may also be specified by the serving cell. The selection of specific neighbor cell selected among the list of neighbor cell may be left to the UE implementation. If the UE is not successful in receiving the RRC Connection Reconfiguration message or the handover command from the neighbor cells, the UE will then start RLF recovery mechanism.

The above dual transmission of the handover command can be useful especially if the low-power cell is deployed at the boundary of two macro cells. If the UE's control plane is anchored at the macro cell, due to the potential weak signal strength from the macro, the UE may not receive the handover command from the macro cell and the additional handover command transmission from the low-power cell may significantly reduce handover failure and radio link failure.

The systems and methods described above may be implemented by any hardware, software or a combination of hardware and software having the above described functions. The software code, either in its entirety or a part thereof, may be stored in a computer readable memory.

The example processes of FIGS. 6-8 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of 600, 700, and 800 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, in the context of the current invention disclosure, as used herein, the terms "computer readable" and "machine readable" are considered technically equivalent unless indicated otherwise.

While several implementations have been provided in the present disclosure, it should be understood that the disclosed systems and methods may be implemented in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions and substitutions and changes in the form and details of the system illustrated may be made by those skilled in the art, without departing from the intent of the disclosure.

What is claimed is:

1. A method, comprising:
receiving, at a first base station, a handover request message from a second base station, wherein the handover request message includes an offloading indicator, the offloading indicator indicating an offloading request and whether the offloading request is for data traffic offloading or control traffic offloading;
determining, in response to the handover request message, whether to accept the offloading request; and
transmitting, from the first base station to the second base station, a response message that indicates whether the offloading request is accepted.

2. The method of claim 1, wherein the offloading request comprises a request for offloading data traffic, and determining whether to accept the offloading request comprises evaluating radio resources at the first base station with respect to bandwidth of one or more radio access barriers.

3. The method of claim 2, further comprising:
in response to the evaluating, including a list of radio access barriers for data traffic offloading in the response message.

4. The method of claim 1, wherein the offloading request comprises a request for offloading control traffic, and determining whether to accept the offloading request comprises evaluating radio resources at the first base station with respect to bandwidth of control signaling.

5. The method of claim 1, wherein the response message comprises a handover failure message indicating that the offloading request is denied.

6. The method of claim 1, further comprising:
receiving, from the second base station, a handover cancellation message that cancels the offloading request.

7. The method of claim 1, wherein the first base station is a small cell base station and the second bases station is a macro cell base station.

8. The method of claim 1, wherein the first base station is a macro cell base station and the second bases station is a small cell base station.

9. A device, comprising:
a memory; and
at least one hardware processor communicatively coupled with the memory and configured to:
receive, at a first base station, a handover request message from a second base station, wherein the handover request message includes an offloading indicator, the offloading indicator indicating an offloading request and whether the offloading request is for data traffic offloading or control traffic offloading;
determine, in response to the handover request message, whether to accept the offloading request; and
transmit, from the first base station to the second base station, a response message that indicates whether the offloading request is accepted.

10. The device of claim 9, wherein the offloading request comprises a request for offloading data traffic, and determining whether to accept the offloading request comprises evaluating radio resources at the first base station with respect to bandwidth of one or more radio access barriers.

11. The device of claim 10, wherein the at least one hardware processor is further configured to:
in response to the evaluating, include a list of radio access barriers for data traffic offloading in the response message.

12. The device of claim 9, wherein the offloading request comprises a request for offloading control traffic, and determining whether to accept the offloading request comprises evaluating radio resources at the first base station with respect to bandwidth of control signaling.

13. The device of claim 9, wherein the response message comprises a handover failure message indicating that the offloading request is denied.

14. The device of claim 9, wherein the at least one hardware processor is further configured to:
receive, from the second base station, a handover cancellation message that cancels the offloading request.

15. A tangible, non-transitory computer-readable medium containing instructions which, when executed, cause a computing device to perform operations comprising:
receiving, at a first base station, a handover request message from a second base station, wherein the handover request message includes an offloading indicator, the offloading indicator indicating an offloading request and whether the offloading request is for data traffic offloading or control traffic offloading;
determining, in response to the handover request message, whether to accept the offloading request; and
transmitting, from the first base station to the second base station, a response message that indicates whether the offloading request is accepted.

16. The tangible, non-transitory computer-readable medium of claim 15, wherein the offloading request comprises a request for offloading data traffic, and determining whether to accept the offloading request comprises evaluating radio resources at the first base station with respect to bandwidth of one or more radio access barriers.

17. The tangible, non-transitory computer-readable medium of claim 16, wherein the operations further comprise:
in response to the evaluating, including a list of radio access barriers for data traffic offloading in the response message.

18. The tangible, non-transitory computer-readable medium of claim 15, wherein the offloading request comprises a request for offloading control traffic, and determining whether to accept the offloading request comprises evaluating radio resources at the first base station with respect to bandwidth of control signaling.

19. The tangible, non-transitory computer-readable medium of claim 15, wherein the response message comprises a handover failure message indicating that the offloading request is denied.

20. The tangible, non-transitory computer-readable medium of claim 15, wherein the operations further comprise:
receiving, from the second base station, a handover cancellation message that cancels the offloading request.

* * * * *